(12) United States Patent
Bittner (10) Patent No.: US 11,324,214 B2
(45) Date of Patent: May 10, 2022

(54) AGRICULTURAL VEHICLE HAVING AN APPLICATION BOOM WITH IMPROVED BONDING MATERIAL

(71) Applicant: CNH Industrial America LLC, New Holland, PA (US)

(72) Inventor: Roy A. Bittner, Cato, WI (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/546,823

(22) Filed: Aug. 21, 2019

(65) Prior Publication Data

US 2021/0051940 A1 Feb. 25, 2021

(51) Int. Cl.
| | | |
|---|---|---|
| *A01M 7/00* | (2006.01) | |
| *B05B 15/18* | (2018.01) | |
| *B05B 1/20* | (2006.01) | |
| *A01C 23/04* | (2006.01) | |
| *A01M 21/04* | (2006.01) | |

(52) U.S. Cl.
CPC ......... *A01M 7/0075* (2013.01); *A01C 23/047* (2013.01); *A01M 21/043* (2013.01); *B05B 1/20* (2013.01); *B05B 15/18* (2018.02)

(58) Field of Classification Search
CPC .............. A01M 7/0075; A01M 21/043; A01C 23/047; B05B 1/20; B05B 15/14; B05B 15/18; B05B 15/62
See application file for complete search history.

(56) References Cited

U.S. PATENT DOCUMENTS

| | | | |
|---|---|---|---|
| 4,711,398 A | * | 12/1987 | Ganderton .......... A01M 7/0071 239/167 |
| 6,842,119 B2 | * | 1/2005 | Nurse ................... B66C 23/905 212/348 |
| 6,945,727 B2 | | 9/2005 | Christman et al. |
| 7,781,039 B2 | | 8/2010 | Anderson et al. |
| 8,746,589 B2 | | 6/2014 | Barker et al. |
| 8,887,763 B2 | | 11/2014 | Cortellini et al. |
| 8,939,383 B2 | | 1/2015 | Honermann et al. |
| 8,979,415 B2 | | 3/2015 | Bouten |

(Continued)

FOREIGN PATENT DOCUMENTS

| | | |
|---|---|---|
| EP | 2837285 A1 | 2/2015 |
| EP | 3150066 B1 | 10/2018 |

OTHER PUBLICATIONS

Jennifer Dewitt; "Deere acquires carbon fiber technology company"; Quad-City Times dated May 2, 2018; https://qctimes.com/business/deere-acquires-carbon-fiber-technology-company/article_313bc2d2-23b1-5df0-aeb3-e1d03209096c.html—(4) pages.

*Primary Examiner* — Darren W Gorman
(74) *Attorney, Agent, or Firm* — Rebecca L. Henkel; Rickard K. DeMille (57) ABSTRACT

An agricultural vehicle includes a chassis, wheels supporting the chassis for moving the vehicle, an application system supported by the chassis and including a product tank storing a volume of agricultural product for delivery onto an agricultural field, and an application boom configured to deliver the agricultural product to the agricultural field. The application boom includes a boom arm segment having a longitudinal tube, an elongated structure coupled to the longitudinal tube, and an elastomeric bonding material affixing the longitudinal tube and the elongated structure.

20 Claims, 7 Drawing Sheets

(56) References Cited

U.S. PATENT DOCUMENTS

| | | |
|---|---|---|
| 9,155,295 B2 | 10/2015 | Bouten |
| 9,839,211 B2 | 12/2017 | DePriest et al. |
| 10,085,437 B2 | 10/2018 | Mariani et al. |
| 2016/0038961 A1 | 2/2016 | Carlson et al. |
| 2017/0000103 A1 | 1/2017 | Wissler et al. |
| 2018/0087565 A1 | 3/2018 | Tortorella et al. |
| 2019/0357519 A1* | 11/2019 | Castro .................... B05B 15/62 |

* cited by examiner

AGRICULTURAL VEHICLE HAVING AN APPLICATION BOOM WITH IMPROVED BONDING MATERIAL

FIELD OF THE INVENTION

The invention relates generally to agricultural machines having agricultural product application equipment and, in particular, to an agricultural vehicle including an application boom utilizing an improved bonding material.

BACKGROUND OF THE INVENTION

Various types of agricultural vehicles (e.g., sprayers, floaters, applicators, collectively referred to herein as applicators) are employed to deliver fertilizer, pesticides, herbicides, or other products to the surface of a field. Such agricultural vehicles typically include an application boom configured to facilitate product delivery over wide swaths of soil. As will be appreciated, longer booms cover wider swaths of soil.

As booms get longer, alternate structural materials become more attractive, due to the altering relationships between costs, weight, and stress characteristics. Composite materials, like carbon fiber (CF), can carry distributed loads well, but a long cantilevered beam made of any material will flex. The immediate deflection may not be an issue in some situations. Rather, a problem may arise when energy from flex in the structure is released back into the system, causing resonate deflection, and a concern to automated height control. Current application boom construction implements joints that are welded, bolted, or bonded. These are typically rigid and pass forces directly from one element to the next.

SUMMARY OF THE INVENTION

According to aspects of the invention, material for introducing a damping effect is used in one or more connection points of the application boom of an agricultural vehicle. The material creates hysteresis in some of the joints. Joints were the inclusion of the dampening may have the most effect are joints loaded in shear. An example joint is the lower portion of an application boom with a core of carbon fiber and aluminum extrusions bonded to the core.

According to one aspect of the invention, an agricultural vehicle includes a chassis, wheels supporting the chassis for moving the vehicle, an application system supported by the chassis and including a product tank storing a volume of agricultural product for delivery onto an agricultural field, and an application boom configured to deliver the agricultural product to the agricultural field. The application boom includes a boom arm segment having a longitudinal tube, an elongated structure coupled to the longitudinal tube, and an elastomeric bonding material affixing the longitudinal tube and the elongated structure.

According to additional aspects of the invention, the longitudinal tube comprises of a carbon fiber material and the longitudinal tube is a carbon fiber tube, and the elongated structure includes an aluminum extrusion. The application system can further include a plurality of spray nozzles for spraying the agricultural product, and the elongated structure includes a rail for receiving a spray nozzle of the plurality of spray nozzles. The elongated structure can also include a chamber for chasing electrical and/or hydraulic lines to a spray nozzle of the plurality of spray nozzles.

According to additional aspects of the invention. The elastomeric bonding material includes an elastomeric sheet, and the elongated structure is contiguous with the elastomeric sheet and the elastomeric sheet is contiguous with the longitudinal tube.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Referring now to the drawings and specifically to FIGS. 1-4, aspects of the invention are shown for use with an agricultural vehicle, which is shown in the figures to be an agricultural sprayer vehicle (referred to herein as simply "sprayer") 10. The sprayer 10 is shown as a front-boom sprayer, such as those available from CNH Industrial, including the Miller Nitro sprayers and New Holland Guardian Series sprayers. Other arrangements for the sprayer 10 are contemplated, including a rear-mounted configuration boom sprayer, such as those available from CNH Industrial, including the Miller Condor Series sprayers and New Holland Guardian Series rear-boom sprayers. Moreover, other agriculture machines and vehicles incorporating aspects of the invention are contemplated, including agriculture vehicles having a boom.

The sprayer 10 includes a frame or chassis 15 having front and back ends 20 and 25, respectively. The chassis 15 provides structural support for various assemblies, systems, and components of the sprayer 10. These various assemblies, systems, and components can include an operator cab 35 in a forward position toward the front end 20 of the chassis 15. An engine 40 and a hydraulic system 45 are shown in a rearward position toward the back end 25 of the chassis 15. The hydraulic system 45 receives power from the engine 40 and includes at least one hydraulic pump which can be in a hydrostat arrangement. The hydraulic pump(s) provide hydraulic pressure for operating hydraulic components within the hydraulic system 45. For sprayers with hydrostatic drives, hydraulic motors are operably connected to the hydraulic pump(s) for rotating wheels 50 of the sprayer 10. In mechanical drive applications, a mechanical transmission receives power from the engine 40 and delivers power for rotating the wheels 50 by way of power-transmitting driveline components. Example power-transmitting driveline components include drive shafts, differentials, and other gear sets in portal, drop boxes, or other housings.

A spray-application system 55 is supported by the chassis 15. The spray-application system 55 includes storage containers, such as a rinse tank 60 for storing water or a rinsing solution and a product tank 65 for storing a volume of product for delivery onto an agricultural field with the sprayer 10. The product includes any of a variety of agricultural liquid products, such as various pesticides, herbicides, fungicides, liquid fertilizers, and other liquids including liquid suspensions beneficial for application onto agricultural fields. A product delivery pump can convey product from the product tank 65 through plumbing components (e.g., interconnected pieces of tubing) and through a boom tubing system. The boom tubing system releases the product out of spray nozzles that are spaced from each other along the width of an application boom (simply referred to as boom 75 herein) during spraying operations of the sprayer 10. Groups or banks of multiple adjacent spray nozzles define multiple spray segments of the spray system. Spray segments are defined along the boom 75 and selectively deliver product for release onto an agricultural field at locations corresponding to positions of activated spray segments.

Figure 1:
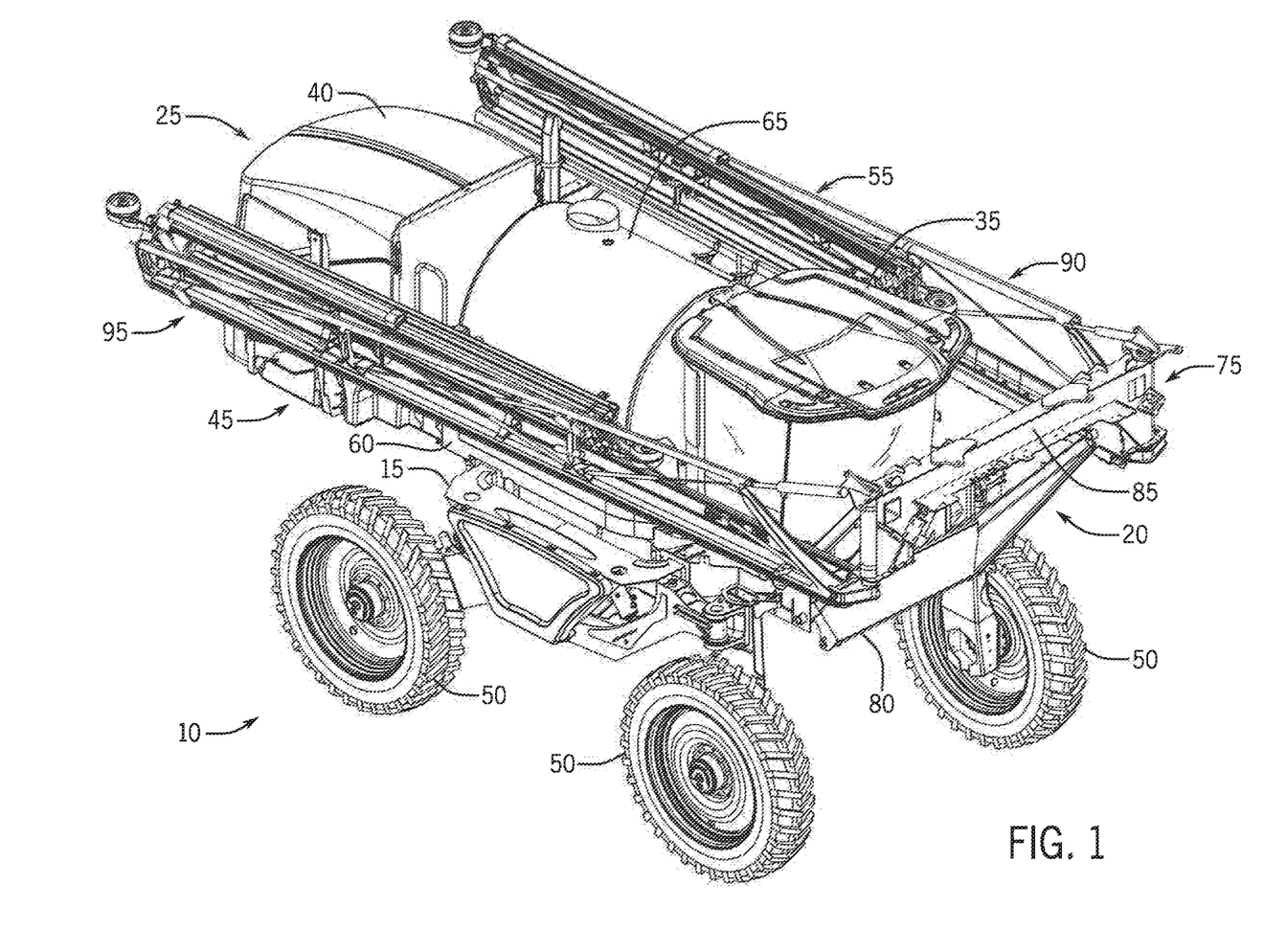
FIG. 1 is an isometric view of a front-boom sprayer from a first perspective, where the boom is in a raised position, and a left boom arm is in a retracted position.
Figure 2:
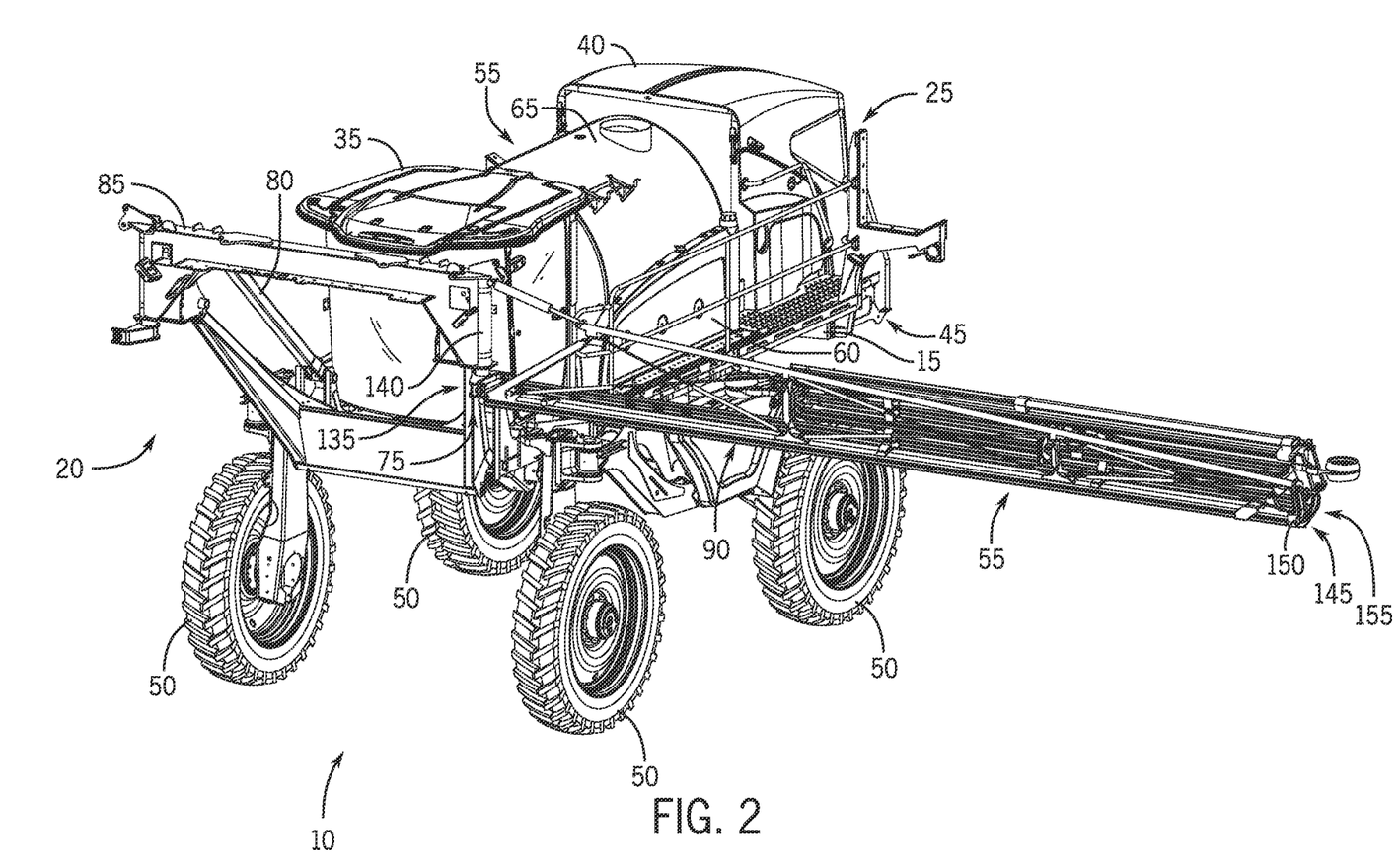
FIG. 2 is an isometric view from a second perspective of the front-boom sprayer of FIG. 1, where the boom is in a raised position, the right boom arm is removed, a first boom arm segment of the left boom arm is in an extended positioned, and second and third boom arm segments of the left boom arm are in the retracted position.

The boom 75 is connected to the chassis 15 with a lift arm arrangement or assembly 80. The lift arm assembly 80 is attached to a boom center section 85. The lift arm assembly 80 is configured to move the boom 75 up and down for adjusting the height of application of the product and/or to raise the boom 75 above objects (e.g., agricultural product). FIGS. 1 and 2 show the boom in a raised position, and FIGS. 3 and 4 show the boom in a lowered position.

Coupled to the boom center section 85, the boom 75 has multiple interconnected segments that collectively define each of a left and right boom arm, respectively. Left and right for the boom 75 are defined with respect to an operator's view of the boom 75 from the operator cab 35. Left and right boom arms extend in opposite directions from the boom center section 85. The left and right boom arms are mirror identical about a longitudinal axis of the sprayer 10, and thus, only left boom arm 90 is shown and described in further detail. For simplicity, FIGS. 1-4 show the right boom arm removed. FIG. 1 shows the left boom arm 90 in a retracted, or transport, position. FIGS. 2-4 show the left boom arm 90 in an extended position.

The left boom arm 90 has multiple segments, including first, second, and third boom arm segments 100, 105, and 110 (FIG. 4), respectively. The number of boom arm segments can vary among sprayer designs. Collectively, the boom center section 85, the left boom arm 90, and the right boom arm 95 define the boom 75, which has left and right ends, respectively. The boom 75 has an inner facing side 125 that faces toward the operator cab 35 and provides a vehicle mounting surface(s) with mounting structures configured for mounting the boom 75 to the lift arm assembly 80. Opposite the inner facing side 125 is an outer facing or outward side 130 of the boom 75 that faces away from the operator cab 35.

Figure 3:
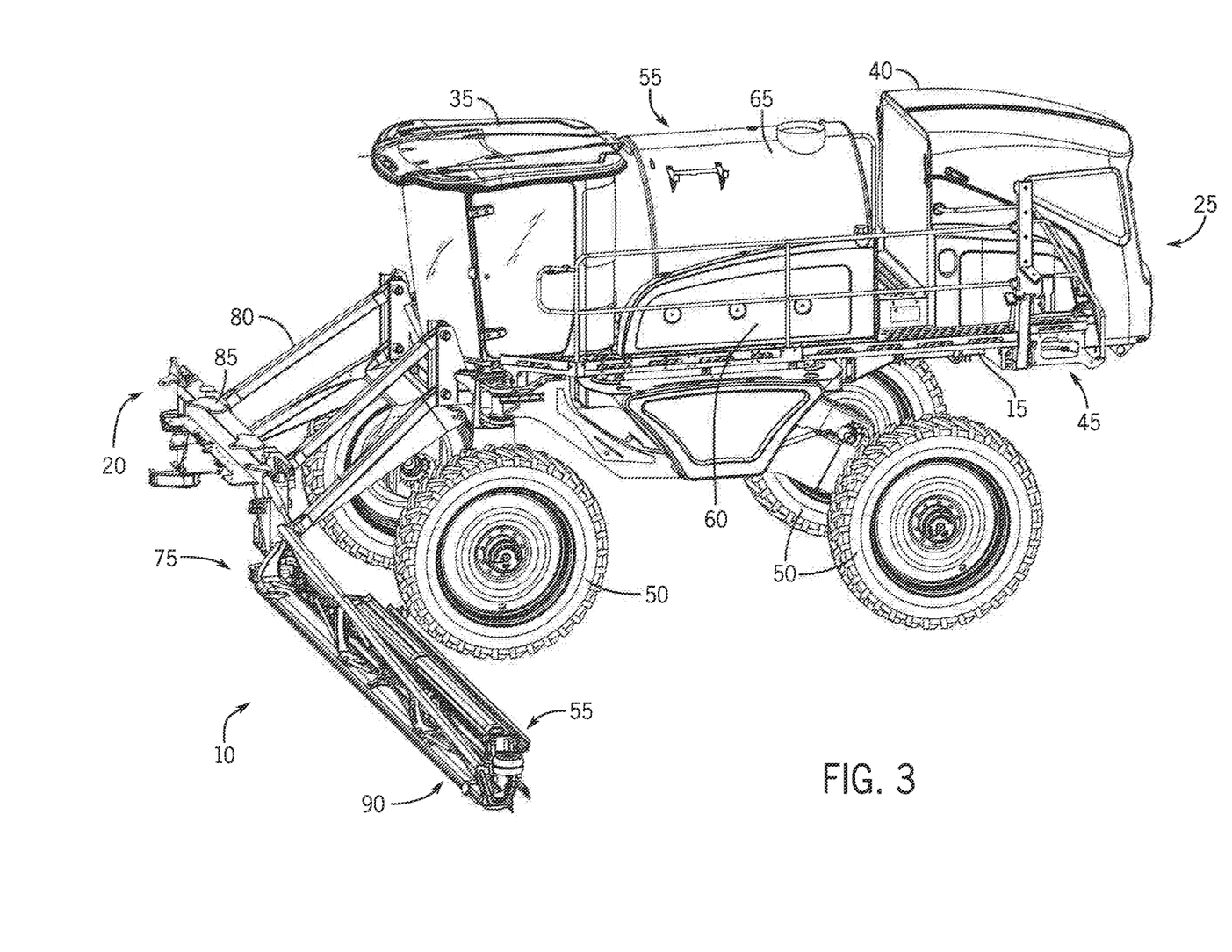
FIG. 3 is an isometric view from the second perspective of the front-boom sprayer of FIG. 1, where the boom is in a lowered position, the right boom arm is removed, the first boom arm segment of the left boom arm is in the extended positioned, and the second and third boom arm segments of the left boom arm are in the retracted position.
Figure 4:
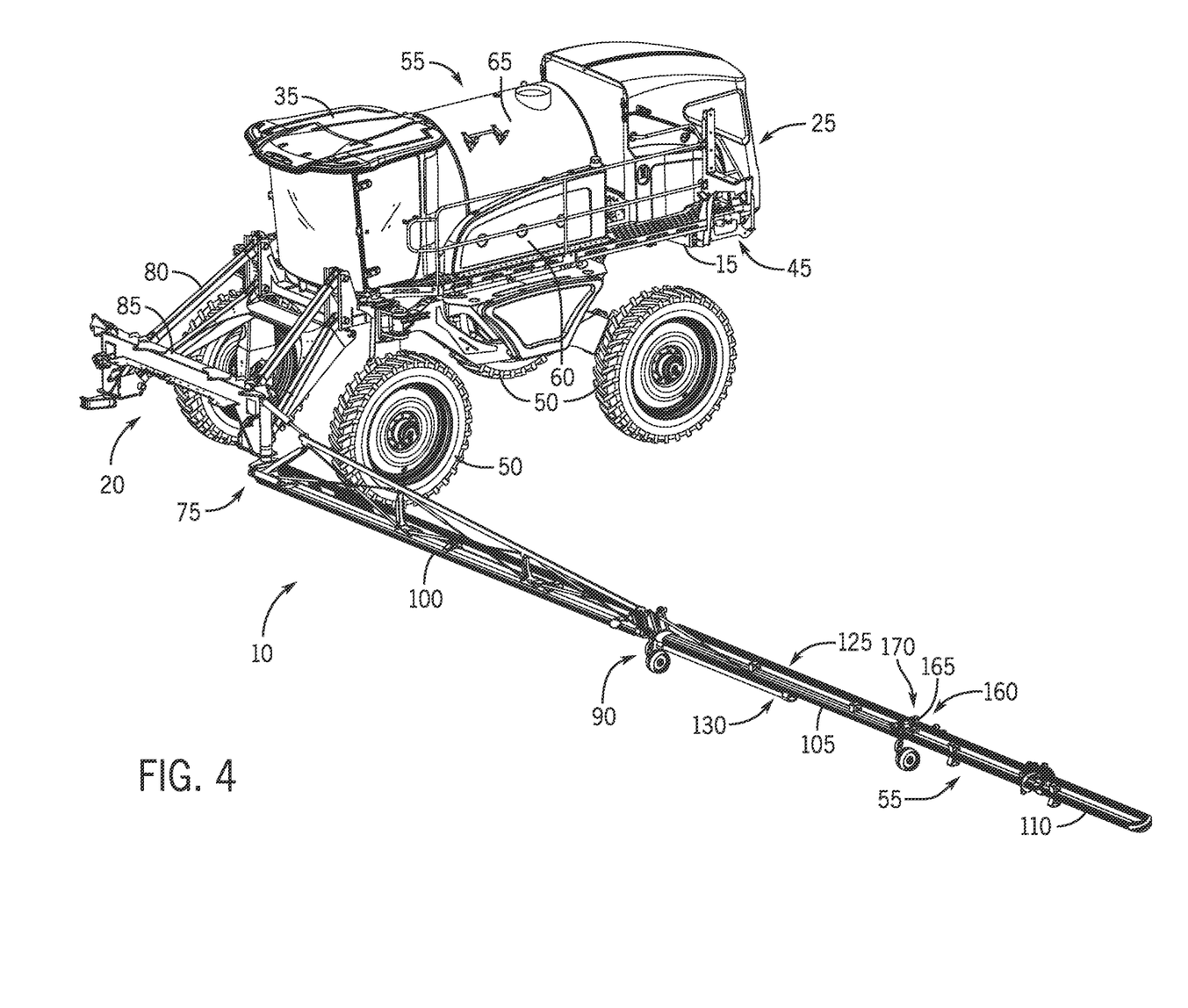
FIG. 4 is an isometric view from the second perspective of the front-boom sprayer of FIG. 1, where the boom is in the lowered position, the right boom arm is removed, and the left boom arm is in a fully extended position.

FIGS. 2 and 3 shows the left boom arm 90 in a first extended, spray position, where only the first segment 100 of the left boom arm 90 is extended. Moreover, FIG. 2 shows the left boom arm 90 at a first spray height and FIG. 3 shows the left boom arm at a second spray height. FIG. 4 shows the left boom arm in a second extended, spray position, where all of the first, second, and third segments 100-110 are extended. The boom center segment and/or the first, second, and third boom arm segments 100-110 are configured with actuators to allow the left boom arm 90 to fold and extend as necessary for operation.

With reference to FIG. 2, the first boom arm segment 100 has an inner end 135 that is connected with hinge 140 to the boom center section 85. The hinge 140 is configured to allow for generally forward/rearward horizontal pivoting of the first boom arm segment 100, and consequently second and third boom arm segments 105 and 110, away/toward the chassis 15 when pivoting the first boom arm segment 100.

The second boom arm segment 105 has an inner end 145 that is connected with hinge 150 to the outer end 155 of the first boom arm segment 100. The hinge 150 is configured to allow for generally rotating the second boom arm segment 105, and consequently third boom arm segment 110, away/ toward the first boom arm segment 100 when pivoting the second boom arm segment 105.

With reference to FIG. 4, the third boom arm segment 110 has an inner end 160 that is connected with hinge 165 to the outer end 170 of the second boom arm segment 105. The hinge 165 is configured to allow for rotational pivoting of the third boom arm segment 110 away/toward the second boom arm segment 105 when pivoting the third boom arm segment 110.

Figure 5:
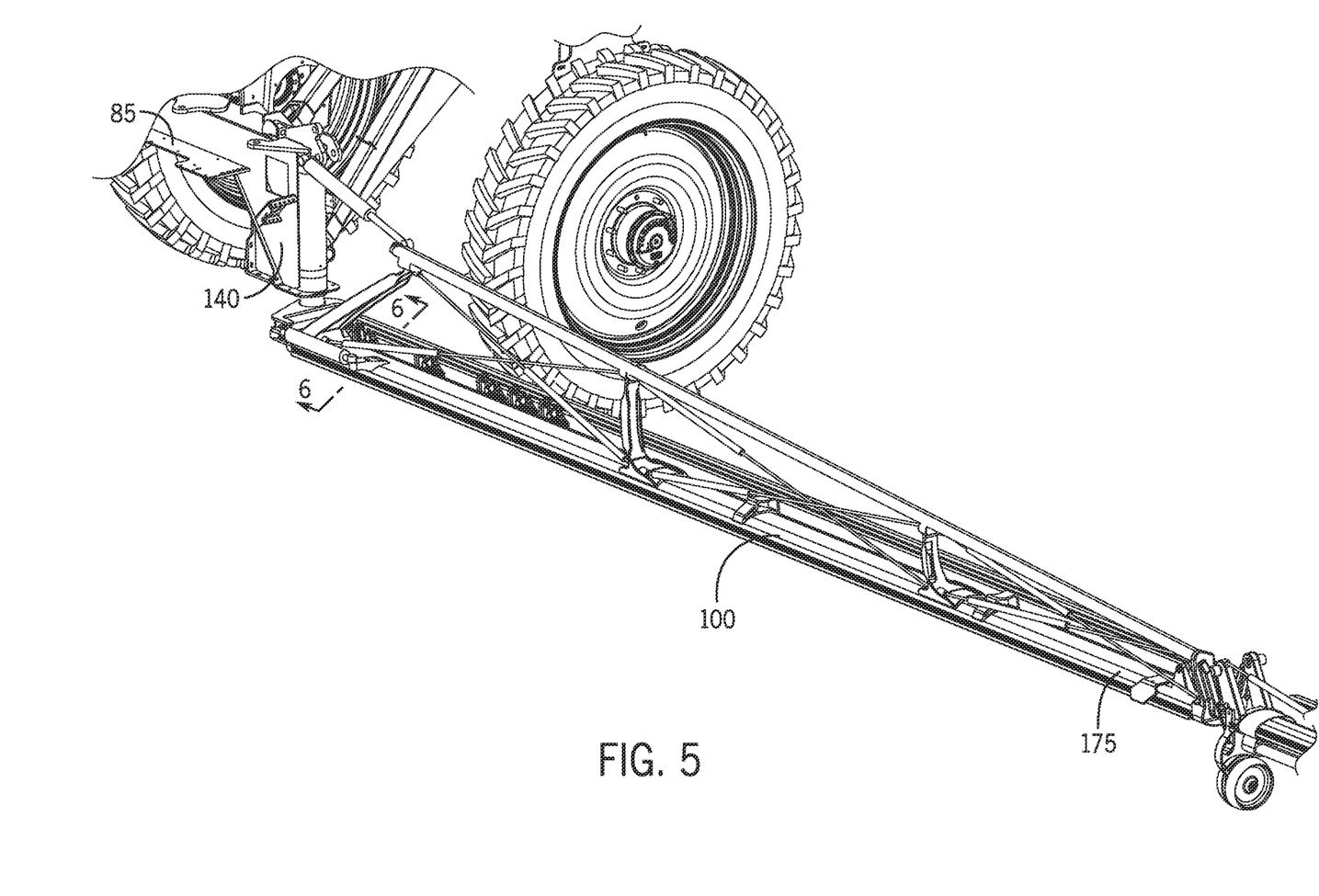
FIG. 5 is an enlarged isometric view of a portion of the left boom arm of FIG. 4 according to some aspects of the present invention.

FIG. 5 is an enlarged view of the first boom arm segment 100 coupled with the boom center section 85 via the hinge 140. The first boom arm segment 100 has a truss arrangement. Included with the truss arrangement is a longitudinal tube 175, which is one example of a tube in the truss arrangement. FIG. 4 shows the right boom arm having multiple longitudinal tubes. Aspects of the invention are discussed in connection with the longitudinal tube 175, but can be used in many other tube arrangements.

Figure 6:
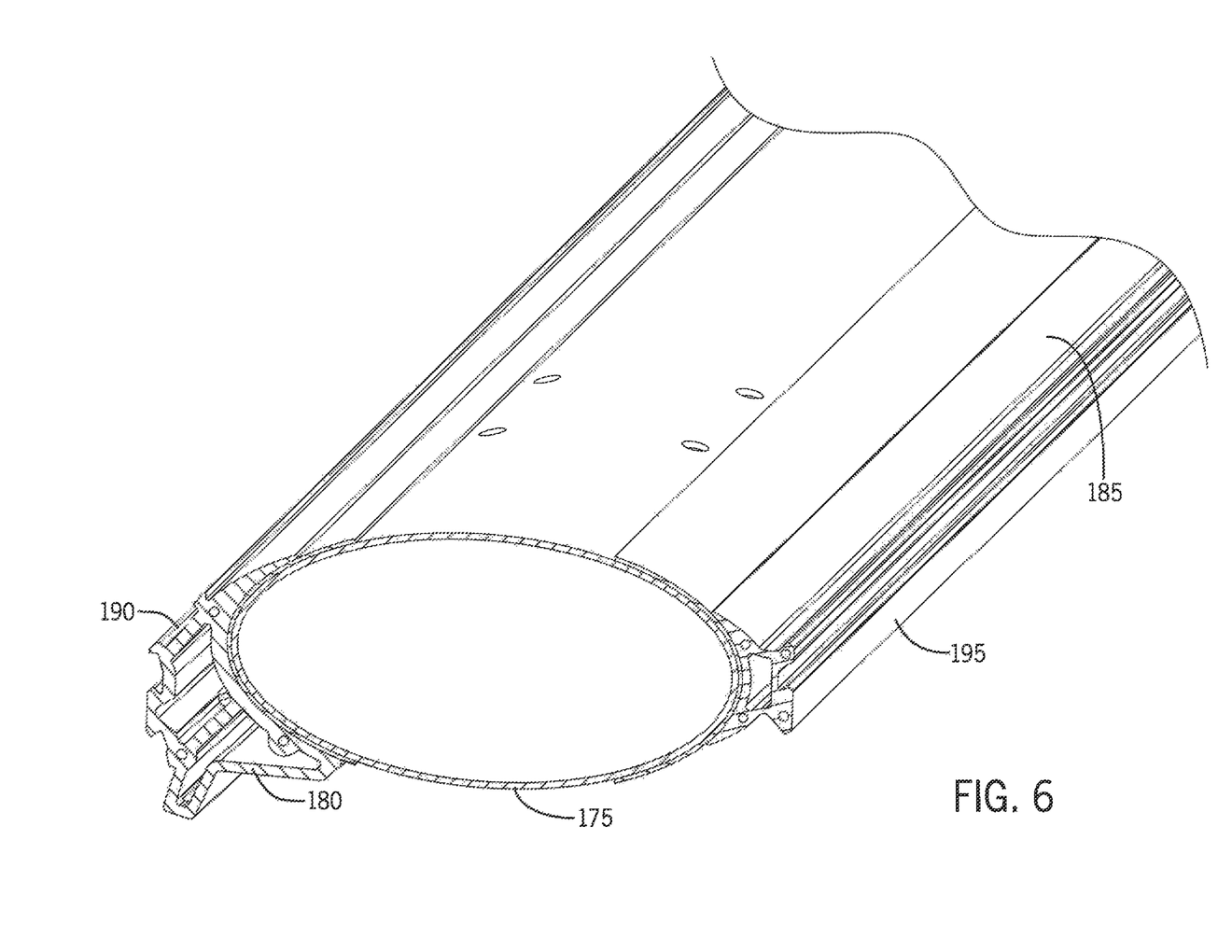
FIG. 6 is a cross-sectional view of a portion of the left boom arm of FIG. 5 along line 6-6'.

FIG. 6 shows a cross-sectional view of a portion of the longitudinal tube 175 in FIG. 5. More specifically, FIG. 6 shows the longitudinal tube 175 coupled to first and second extrusions 180 and 185, respectively. As application booms get larger, alternate structural materials to metal (e.g., steel) become more attractive, due to the altering relationships between costs, weight, and stress characteristics. Composite materials like carbon fiber (CF), fiberglass, ceramic matrix composites, etc. can carry distributed loads well. The shown longitudinal tube 175 is a composite material such as CF. Also as shown in FIG. 6, the longitudinal tube 175 has an elliptical or oblong cross section for aerodynamic reasons, but can be a circular cross section.

The first and second extrusions 180 and 185 can comprise of a different material from the CF tube 175. For example, the first and second extrusions 180 and 185 can consist of extruded aluminum, but other materials are possible. The following benefits can occur by adding bonded aluminum strips.

Protect against damage from collisions or light impacts.

Reinforce CF tubes in areas of compressive loads (control buckling of thin walls).

Provide mounting points for attachments (reduce stress risers from unnecessary holes).

Shaped to control air flow (or not produce turbulence).

The shown first and second extrusions 180 and 185 include rails 190 and 195 for clipping spray nozzles or other apparatus to the application boom 75. In the construction shown, one of the aluminum extrusions include a chamber for chasing electrical and hydraulic lines to the spray nozzles. The first and second extrusions 180 and 185 can comprise of a different material from the CF tube 175. For example, the first and second extrusions 180 and 185 can consist of extruded aluminum, but other materials are possible including other metals, polymers, ceramics, etc. The first and second extrusions 180 and 185 can also be members made from other manufacturing techniques than extrusion processing.

Stress and strain (e.g., deflection) are inevitable in any boom design. Three example contributors to stress and strain are as follows.

Stress in an application boom is generated by the boom's inertia, resisted by the boom's restraints. Rotational inertia is a function of both the mass of an object, and its distance to the axis of rotation.

Joint designs that are multi-axially rigid and restrain tolerable deflections for little or no reason.

Element bonding methods (like welding) that generate stress concentration rather than dispersing stress concentration.

Agricultural machine designers are often tempted to simply add material in areas of high stress. But adding material also adds mass, and therefore increases inertia, which in turn causes more stress, creating a stress-mass cycle. Typical example design criteria to mitigate stress in an application boom include the following.

Choose the material of each element individually, based on the loading, with goal of reducing the inertia of the entire system.

Choose joint designs (and shapes) based on dispersion of the stress from it's particular loading, but allowing tolerable deflections in the other axis.

Choose bonding methods that distribute loads over large areas rather than in point or line contacts like welding does.

The selection of the CF longitudinal tube 175, the first and second extrusions 180 and 185, and the bonding of the first and second extrusions 180 and 185 to the CF longitudinal tube 175 help reduce stress and strain on the boom 75.

A long cantilevered beam, such as the first boom arm segment 100, will flex. The immediate deflection may not be an issue in some situations. Rather, a problem may arise when energy from flex in the structure is released back into the system, causing resonate deflection, and a concern to automated height control. Deflection has a more indirect impact on design. Resonance generated by the release of energy stored in the structure by the structure's deflections end up being detrimental to the performance of the suspension system supporting the boom.

Various method of mitigating deflection and issues with deflection include the following.

Minimize overall deflection by using materials with high strength to weight ratios.

Choose the material of each element individually, based on the loading, with goal of reducing the inertia of the entire system Allow deflections in directions and along axis where the deflection is tolerable, or when other elements of the boom can absorb that particular load, Integrate damping systems into the structure, not to reduce deflection, but absorb energy that would otherwise cause resonance.

It may be possible to dissipate some of the energy accumulated in the structure (e.g., the first boom arm segment 100) as it flexes by utilizing an elastomer bonding material between the first and second extrusions 180 and 185 and the CF longitudinal tube 175. Because the loading places the bonding material into shear, bonding with an elastomeric material having high hysteresis helps dissipate the energy. This would dampen horizontal movement of the first boom arm segment 100.

An elastomer or elastomeric material is a polymer having elastic properties. An elastomer has viscoelasticity (i.e., both viscosity and elasticity), typically weak intermolecular forces, generally low Young's modulus, and generally high failure strain compared with other materials. At ambient temperatures, elastomers are relatively soft and deformable. The elastomer discussed herein provides adhesive and damping properties.

Figure 7:
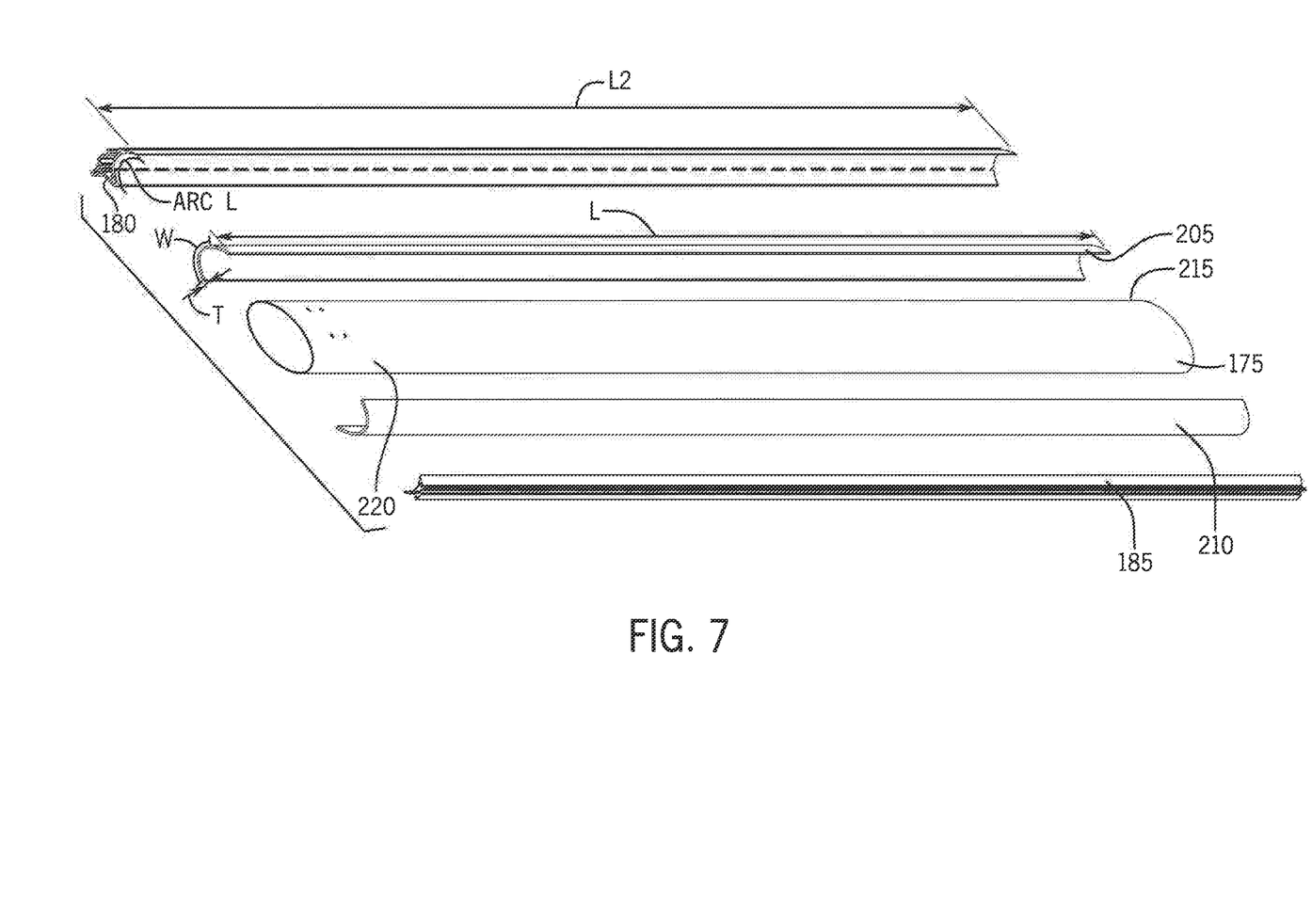
FIG. 7 is an exploded, assembly view of a portion of the left boom arm of FIG. 5.

FIGS. 6 and 7 show elastomeric bonding material coupling first and second extrusions 180 and 185 to the longitudinal tube 175. The elastomeric bonding material is shown in the construction as first and second elastomeric sheets 205 and 210, respectively. Example elastomeric bonding materials include neoprene rubber, buna-s, and buna-n. The first elastomeric sheet 205 has a width W equal to or less than the arc length ArcL of the first extrusion 180. In some constructions, the width W of the first elastomeric sheet 205 is between 90%-100% the arc length ArcL of the first extrusion 180. The first elastomeric sheet 205 has a length L1 equal to or less than the length L2 of the first extrusion 180. Preferably, the length L1 is between 90%-100% the length L2. The first elastomeric sheet 205 has a thickness T. The design and arrangement of the second elastomeric sheet 210 can be similar to the first elastomeric sheet 205. The first and second elastomeric sheets 205 and 210 dissipate energy accumulated in the structure first boom arm segment 100 as it flexes. The loading places the first and second elastomeric sheets 205 and 210 into shear, thereby limiting the energy transferred between the longitudinal tube 175 and the first and second extrusions 180 and 185, and mostly dampen horizontal movement of the first boom arm segment 100.

FIG. 7 is an exploded view of a portion of the first boom arm segment 100. During the manufacturing process, the first elastomeric sheet 205 is applied at a first location 215 on a first lateral side of the longitudinal tube 175, and the second elastomeric sheet 210 is placed at a second location 220 on a second lateral side of the longitudinal tube 175. The first extrusion 180 is then disposed onto the first elastomeric sheet 205, and the second extrusion 185 is then disposed onto the second elastomeric sheet 210. The first and second elastomeric sheets 205 and 210 are then allowed to cure affixing the first and second extrusions 180 and 185 to the longitudinal tube 175. While the term "sheet" is used herein, the "sheet" can take the form of a liquid material that is applied and cured to form the "sheet." Fasteners can be used to help hold the assembly in place while the first and second elastomeric sheets 205 and 210 cure. Once the adhesive layer cures, the assembly can then be used as part of the first boom arm segment 100.

Accordingly, one or more aspects of the invention provide a boom design were the energy required to deflect the structure is dissipated through hysteresis built into the bonds within the structure. Loads from turning, accelerations, and braking would impart shear stresses in the joint between the CF and the aluminum. The energy imparted on the bonding material would be absorbed by its hysteretic properties.

Although the best mode contemplated by the inventors of carrying out the present invention is disclosed above, practice of the above invention is not limited thereto. It will be manifest that various additions, modifications, and rearrangements of the features of the present invention may be made without deviating from the spirit and the scope of the underlying inventive concept.

What is claimed is:

1. An agricultural vehicle comprising:
   a chassis;
   wheels supporting the chassis for moving the vehicle;
   an application system supported by the chassis and including a product tank storing a volume of agricultural product for delivery onto an agricultural field;
   an application boom configured to deliver the agricultural product to the agricultural field, the application boom including a boom arm segment having:
      a longitudinal tube;
      an elongated structure coupled to the longitudinal tube; and
      an elastomeric bonding material affixing the longitudinal tube and the elongated structure;
      wherein the elongated structure includes an integrally formed rail having a protrusion configured to mechanically engage a plurality of clips to couple a corresponding plurality of spray nozzles to the elongated structure.

2. The agricultural vehicle of claim 1, wherein the longitudinal tube comprises of a composite material.

3. The agricultural vehicle of claim 1, wherein the longitudinal tube comprises of a carbon fiber material, and the longitudinal tube is a carbon fiber tube.

4. The agricultural vehicle of claim 1, wherein the elongated structure includes an aluminum extrusion.

5. The agricultural vehicle of claim 1, wherein the elongated structure includes a chamber configured to facilitate passage of one or more electrical and/or hydraulic lines to a spray nozzle of the plurality of spray nozzles.

6. The agricultural vehicle of claim 1, wherein the elastomeric bonding material includes an elastomeric sheet.

7. The agricultural vehicle of claim 6, wherein the elongated structure is contiguous with the elastomeric sheet, and the elastomeric sheet is contiguous with the longitudinal tube.

8. The agricultural vehicle of claim 1, wherein the boom arm segment includes a truss system having the longitudinal tube.

9. An agricultural vehicle comprising:
   a chassis;
   wheels supporting the chassis for moving the vehicle;
   an application system supported by the chassis and including a product tank storing a volume of agricultural product for delivery onto an agricultural field;
   an application boom configured to deliver the agricultural product to the agricultural field, the application boom including a boom arm segment having:
      a longitudinal carbon fiber tube;
      an elongated aluminum extrusion coupled to the longitudinal carbon fiber tube; and
      an elastomeric bonding sheet affixing the longitudinal carbon fiber tube and the elongated aluminum extrusion;
      wherein the elongated aluminum extrusion includes an integrally formed rail having a protrusion configured to mechanically engage a plurality of clips to couple a corresponding plurality of spray nozzles to the elongated aluminum extrusion.

10. The agricultural vehicle of claim 9, wherein the elongated aluminum extrusion includes a chamber configured to facilitate passage of one or more electrical and/or hydraulic lines to a spray nozzle of the plurality of spray nozzles.

11. The agricultural vehicle of claim 9, wherein the elongated aluminum extrusion is contiguous with the elastomeric bonding sheet, and the elastomeric bonding sheet is contiguous with the longitudinal carbon fiber tube.

12. The agricultural vehicle of claim 9, wherein the boom arm segment includes a truss system having the longitudinal carbon fiber tube.

13. The agricultural vehicle of claim 10, wherein the elongated aluminum extrusion entirely surrounds the chamber along a longitudinal axis of the elongated aluminum extrusion.

14. The agricultural vehicle of claim 5, wherein the elongated structure entirely surrounds the chamber along a longitudinal axis of the elongated structure.

15. An application boom configured to deliver agricultural product to an agricultural field, the application boom including a boom arm segment having:
   a longitudinal tube;
   an elongated structure coupled to the longitudinal tube; and
   an elastomeric bonding material affixing the longitudinal tube and the elongated structure;
   wherein the elongated structure includes an integrally formed rail having a protrusion configured to mechanically engage a plurality of clips to couple a corresponding plurality of spray nozzles to the elongated structure.

16. The application boom of claim 15, wherein the elongated structure includes a chamber configured to facilitate passage of one or more electrical and/or hydraulic lines to a spray nozzle of the plurality of spray nozzles.

17. The application boom of claim 16, wherein the elongated structure entirely surrounds the chamber along a longitudinal axis of the elongated structure.

18. The application boom of claim 15, wherein the elastomeric bonding material includes an elastomeric sheet.

19. The application boom of claim 18, wherein the elongated structure is contiguous with the elastomeric sheet, and the elastomeric sheet is contiguous with the longitudinal tube.

20. The application boom of claim 15, wherein the boom arm segment includes a truss system having the longitudinal tube.

* * * * *